(12) United States Patent
Devitt (10) Patent No.: US 11,027,802 B1
(45) Date of Patent: *Jun. 8, 2021

(54) ALIGNMENT GUIDE FOR PONTOON BOAT LIFT

(71) Applicant: Jon W. Devitt, Ida Grove, IA (US)

(72) Inventor: Jon W. Devitt, Ida Grove, IA (US)

(73) Assignee: Midwest Industries, Inc., Ida Grove, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,598

(22) Filed: Jul. 31, 2020

Related U.S. Application Data (63) Continuation of application No. 16/783,491, filed on Feb. 6, 2020, now Pat. No. 10,766,581.

(51) Int. Cl.
*B63C 5/02* (2006.01)
*B63B 1/02* (2006.01)

(52) U.S. Cl.
CPC . *B63C 5/02* (2013.01); *B63B 1/02* (2013.01)

(58) Field of Classification Search
CPC .................................. B63C 1/10; B60P 3/1075
See application file for complete search history.

(56) References Cited

U.S. PATENT DOCUMENTS

| | | | |
|---|---|---|---|
| 6,648,360 B1* | 11/2003 | Dray | B60P 3/1033 280/414.1 |
| 2006/0266270 A1* | 11/2006 | Derner | B63C 3/06 114/48 |
| 2015/0217671 A1* | 8/2015 | Bryant et al. | B60P 3/1033 280/414.1 |

* cited by examiner

*Primary Examiner* — Tara Mayo-Pinnock
(74) *Attorney, Agent, or Firm* — Sturm ¿ Fix LLP (57) ABSTRACT

An alignment guide for a pontoon boat lift that includes a pair of laterally spaced rails, where the spacing corresponds to the spacing between the pontoon floats. The rails are attached to the boat lift by adjustable brackets, so they are positioned at an elevation above the waterline of the pontoon floats, and below the deck that is supported by the floats. A stop bar is positioned at an elevation above the boat motor and extends between rail extensions that are directed downwardly and rearwardly from the spaced rails.

12 Claims, 8 Drawing Sheets

ALIGNMENT GUIDE FOR PONTOON BOAT LIFT

CROSS REFERENCE TO RELATED APPLICATIONS

This application is a Continuation of U.S. Ser. No. 16/783,491 filed Feb. 6, 2020, entitled ALIGNMENT GUIDE FOR A PONTOON BOAT LIFT, which is a continuation of Ser. No. 16/059,681 filed Aug. 9, 2018, entitled ALIGNMENT GUIDE FOR A PONTOON BOAT LIFT and claims priority from those two applications and from U.S. Provisional Patent Application, Ser. No. 62/626,226, filed Feb. 5, 2018, entitled RAIL GUIDE FOR DOCKS AND BOAT LIFTS AND LOADGUIDE/BUMPER FOR PONTOON BOAT LIFTS, all of which are incorporated herein by reference in their entirety.

BACKGROUND OF INVENTION

Field of the Invention

The present invention relates to the field of boat lift, and more particularly to an alignment guide for loading a pontoon boat on a boat lift.

Description of the Related Art

The current practice used when loading a pontoon boat on a boat lift is to enter the boat docking area unguided. Typically, the occupants reach outside the boat in an attempt to stabilize the craft and prevent it from striking the sides of the boat lift, which could result in damage. This practice can be dangerous and is often ineffective, particularly when rough water conditions exist.

Ideally, pontoon boats should be properly positioned on the lift to ensure safe and efficient lifting and/or lowering of the craft. Bumpers are used on boat lifts to prevent the watercraft from directly hitting the lift rigid structure, but they do not assist in aligning the boat as it advances toward the desired position.

As a consequence of the foregoing situation, there has existed, a longstanding need for a new and improved alignment guide for pontoon boat lifts. The provision of such a construction is a stated objective of the present invention.

BRIEF SUMMARY OF THE INVENTION

Briefly stated, the present invention provides an alignment guide for a pontoon boat lift that includes a pair of laterally spaced rails, where the spacing corresponds to the spacing between the pontoon floats. The rails are attached to the boat lift by adjustable brackets, so they are positioned at an elevation above the waterline of the pontoon floats, and below the deck that is supported by the floats. A stop bar is positioned at an elevation above the lowermost portion of the boat motor and extends between rail extensions that are directed downwardly and rearwardly from the spaced rails. The alignment guide functions to provide support under the deck of the pontoon boat, to limit movement of the craft from port and starboard, and to stop the craft when it has advanced to the full forward position to keep it properly positioned bow to stern.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings wherein.

DETAILED DESCRIPTION OF THE INVENTION

Figure 1:
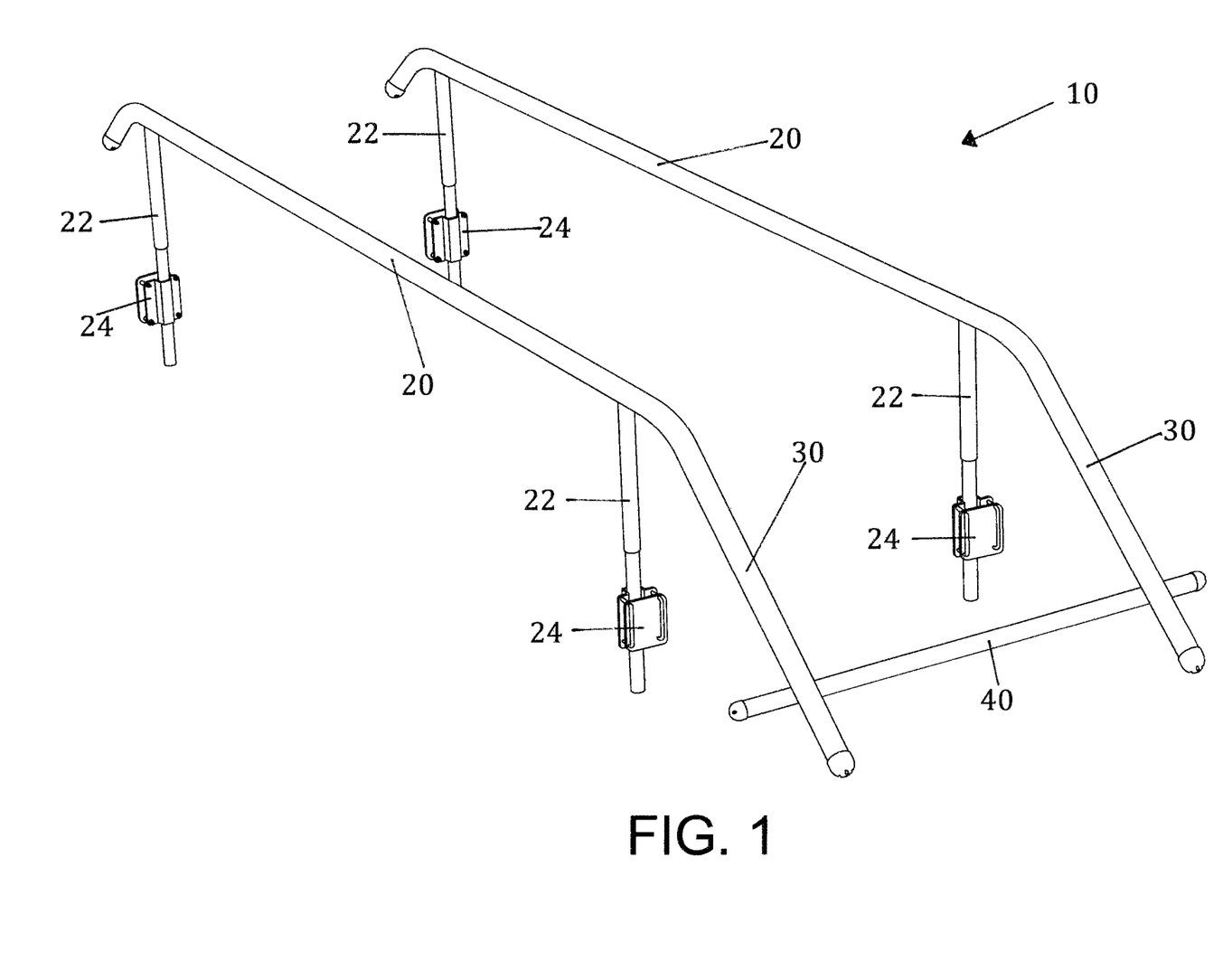
FIG. 1 is a perspective view showing the alignment guide of the present invention.
Figure 2:
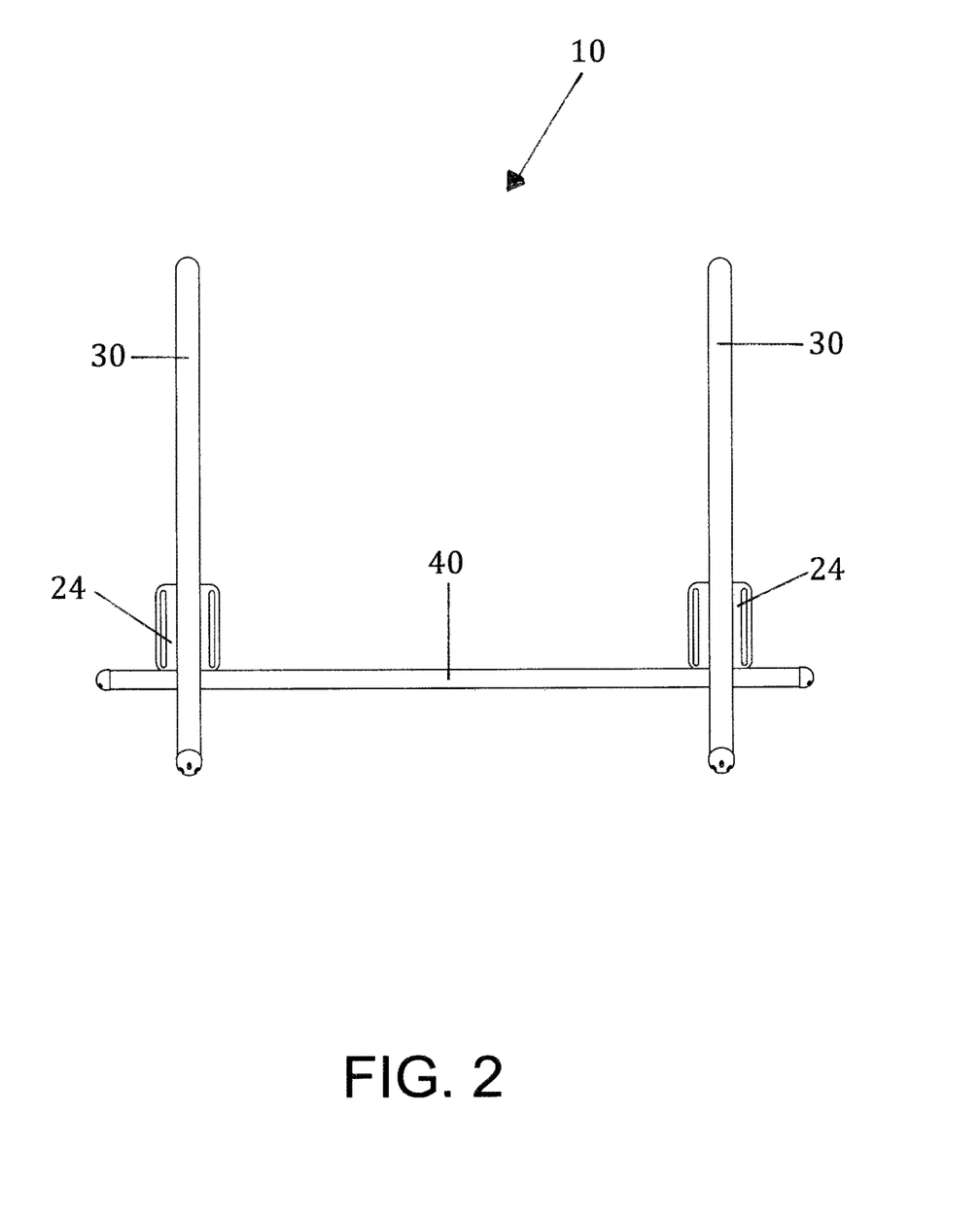
FIG. 2 is a rear elevational view thereof.
Figure 3:
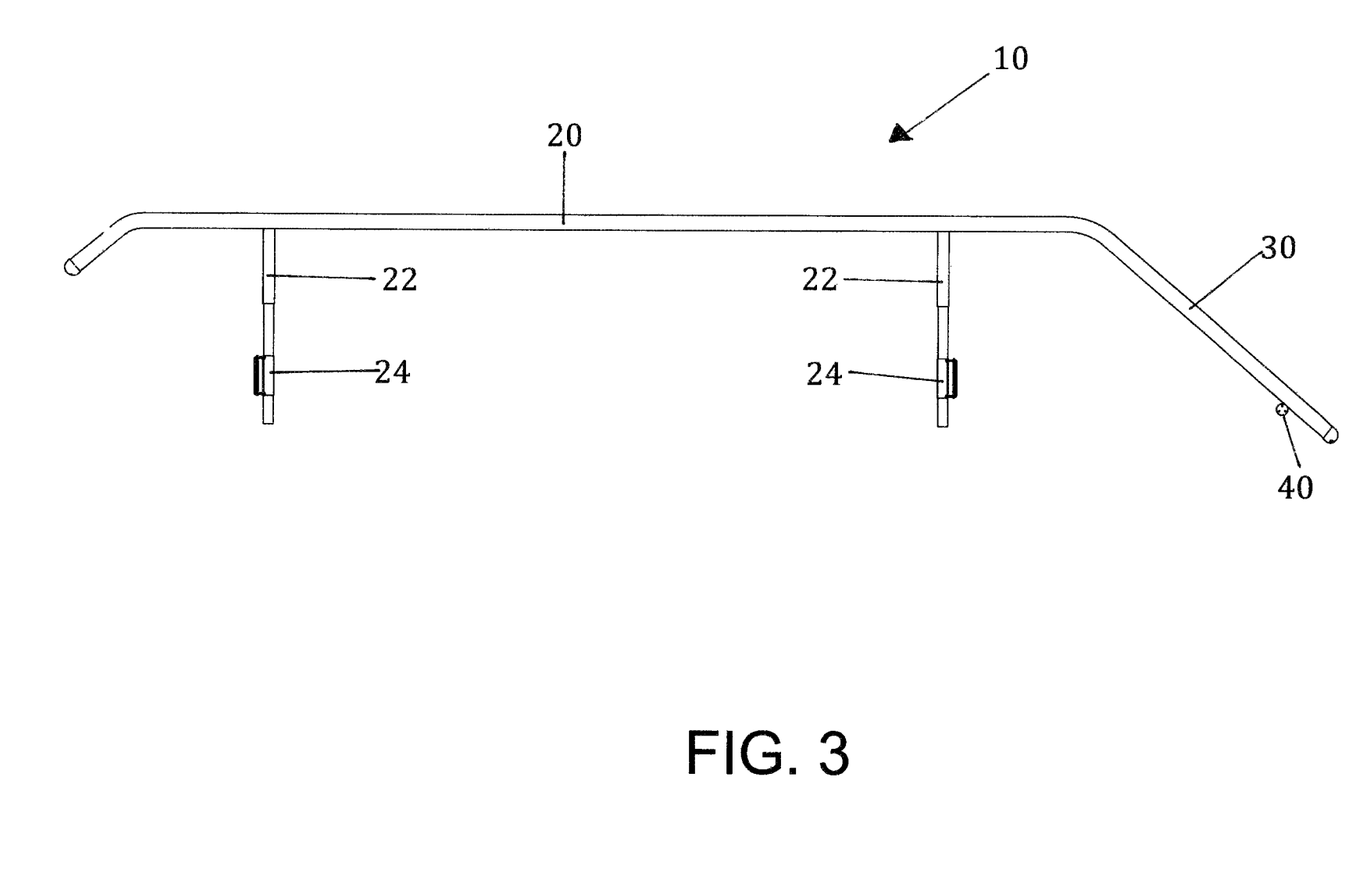
FIG. 3 is a side elevational view thereof.
Figure 4:
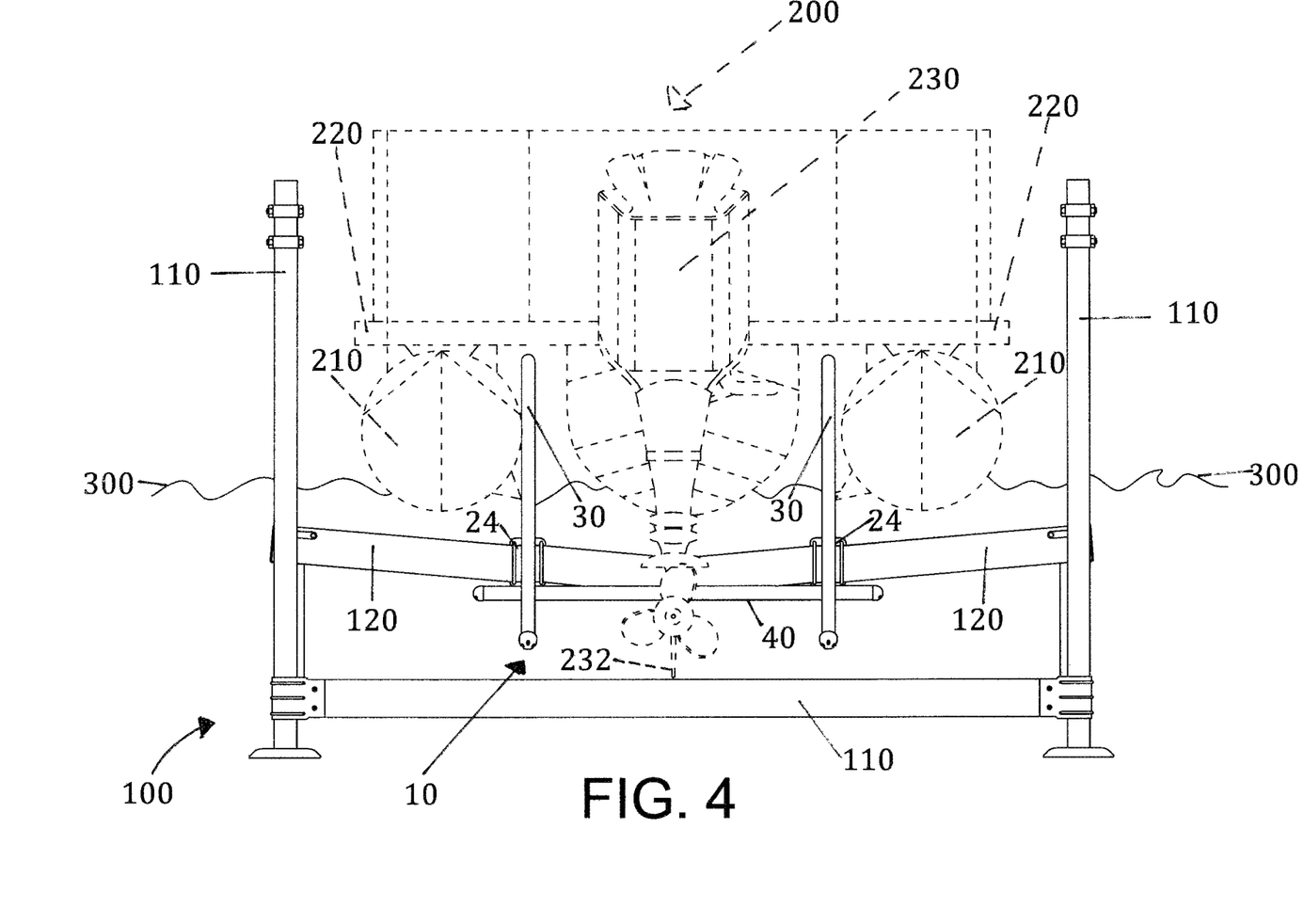
FIG. 4 is a rear elevational view similar to FIG. 2, showing the alignment guide attached to a boat lift, with a pontoon boat loaded on the lift when the lift is in the lowered loading position.
Figure 5:
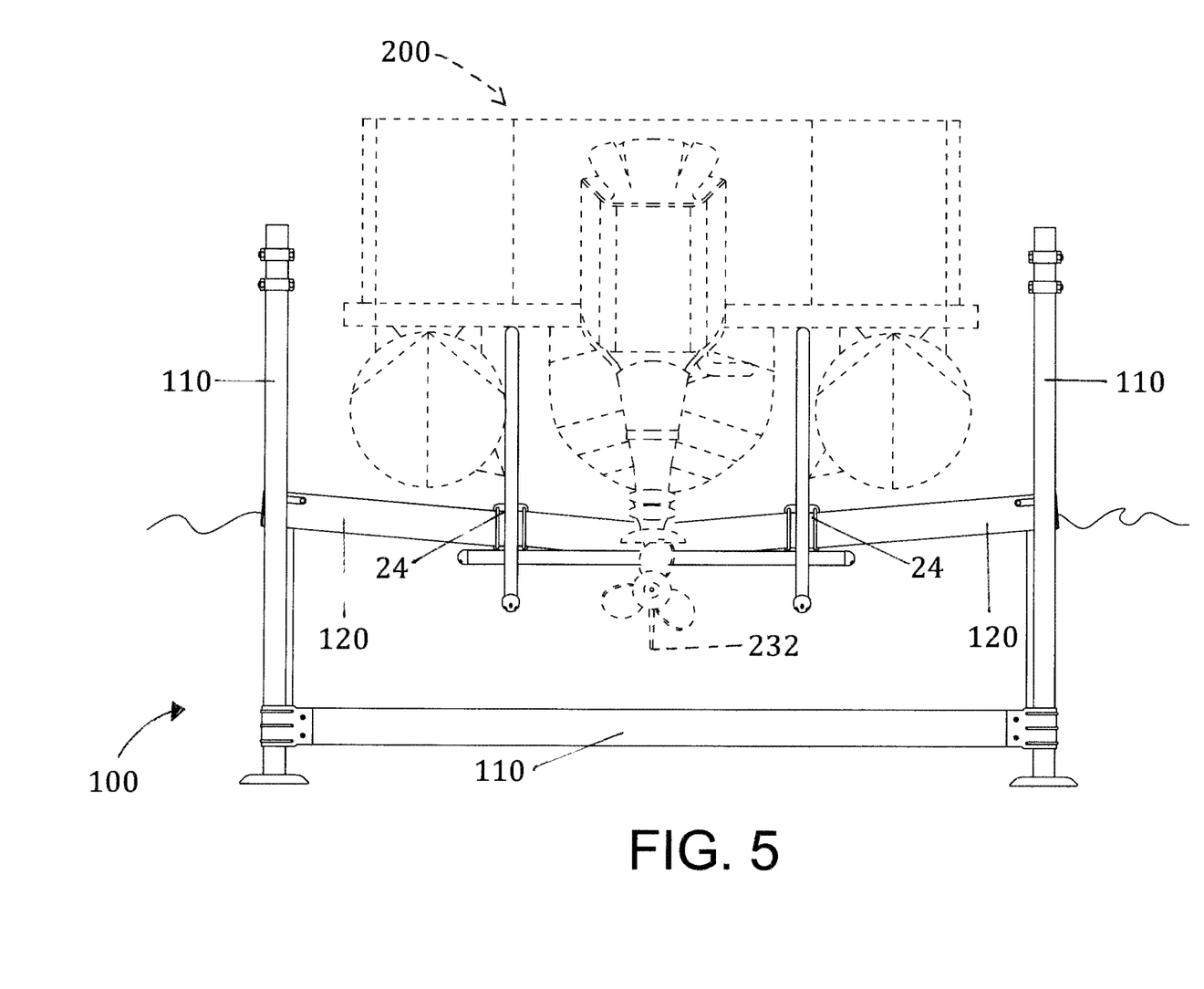
FIG. 5 is a rear elevational view similar to FIG. 4, but showing the lift in the raised position.
Figure 6:
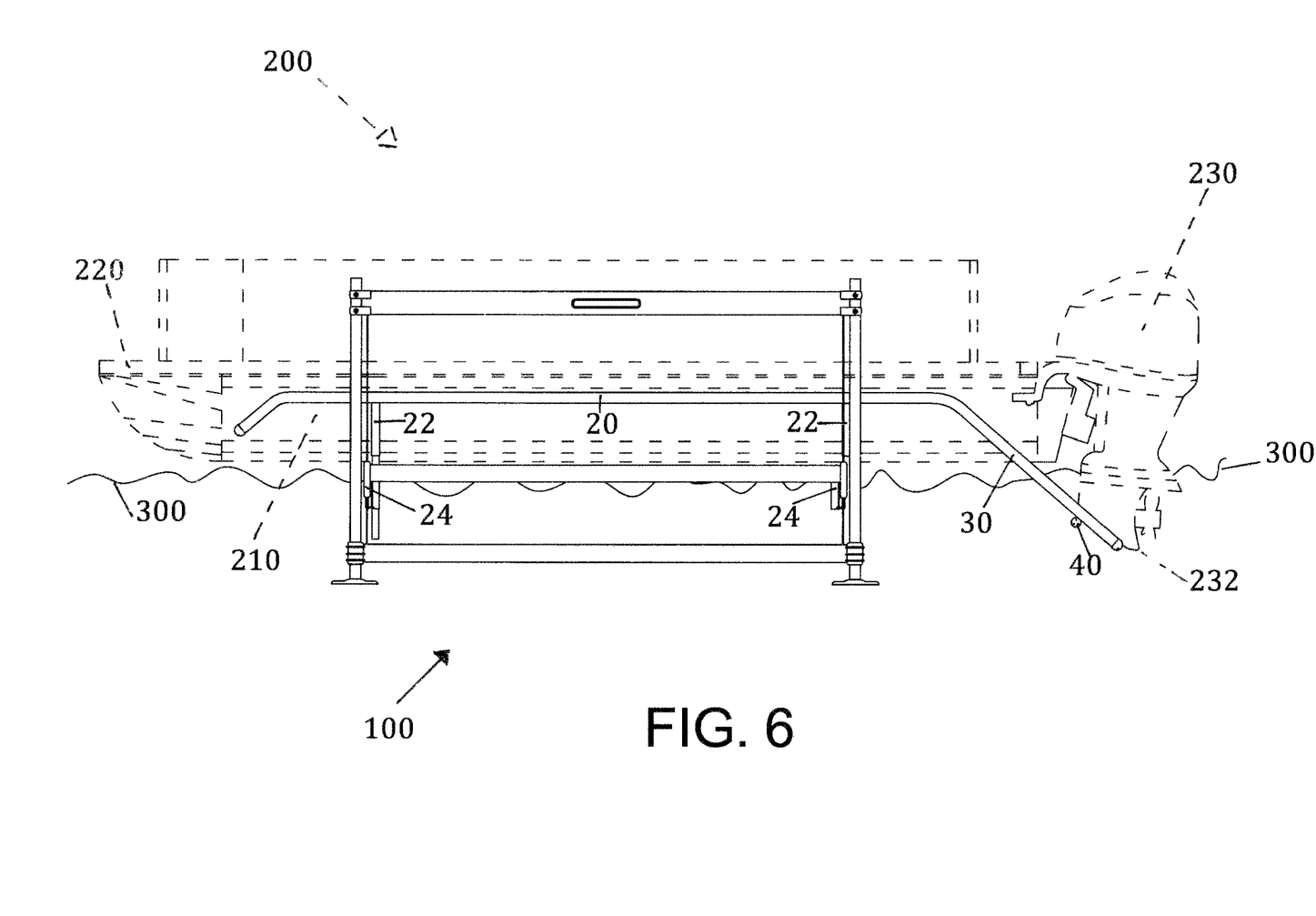
FIG. 6 is a side elevational view similar to FIG. 3, showing the pontoon boat advanced to the full forward position on the boat lift when the lift is in the lowered loading position.
Figure 7:
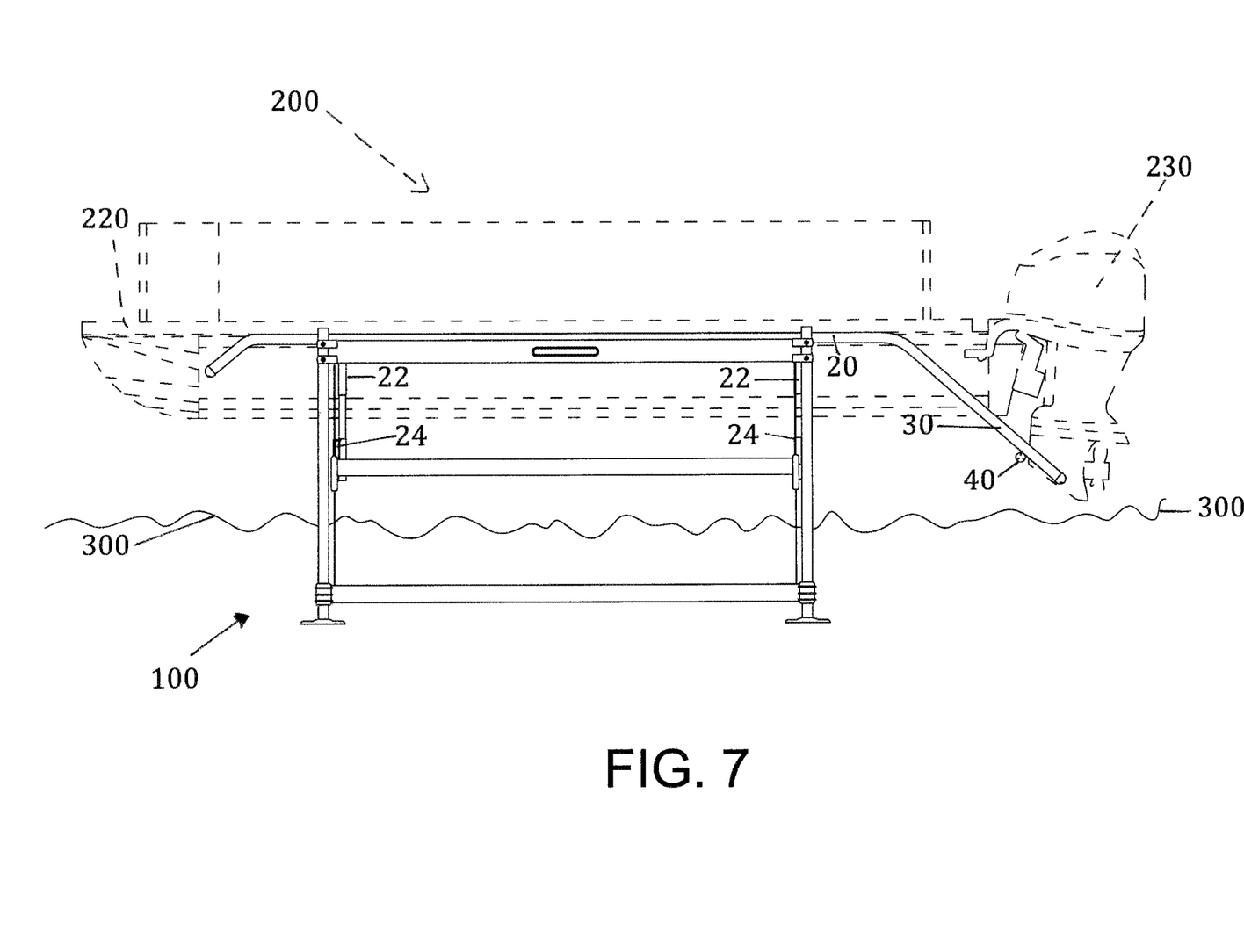
FIG. 7 is a side elevational view similar to FIG. 6, but showing the lift in the raised position.

As can be seen by the reference to the drawings, and particularly to FIGS. 1-3, the alignment guide for a pontoon boat lift then forms the basis of the present invention is designated generally by the reference numeral 10. The alignment guide 10 includes a pair of laterally spaced, horizontally disposed rails 20, each having a downwardly and rearwardly directed extension 30, with a horizontal stop bar 40 that extends between and interconnects lower portions of the extensions 30. Vertical supports 22 extend down from the front and rear of each of the rails 20 and each support 22 adjustably receives an attachment bracket 24.

As best shown in FIGS. 4-7, a conventional boat lift 100 has a rectangular frame 110 that carries vertically movable transverse support beams 120 at the front and rear of the frame 110. The transverse support beams 120 are movable between a lowered position to load, and a raised position to lift the boat out of the water. The attachment brackets 24 connect the vertical supports 22 of the rails 20 to the support beams 120 of the boat lift 100.

Conventional pontoon boats 200 have a pair of laterally spaced pontoon floats 210 that support a deck 220, with a motor 230 mounted to the rear of the deck 220. The waterline 300 is located at an elevation with respect to the floats 210 depending upon the design and weight of the boat 200. The adjustment guide 10 of the present invention may be adjustably mounted on a boat lift 100 to prepare it for use with any specific one of a variety of such pontoon boats 200.

In use, to adapt the alignment guide 10 for a specific pontoon boat 200, the brackets 24 on the vertical supports 22 of the rails 20 are attached and adjusted so that the horizontal sections of the rails 20 are disposed at an elevation that is above the waterline 300 of the pontoon floats 210, and below the deck 220 when the boat lift 200 is in the lower position. Also, the lateral spacing of the rails 20 is adjusted to correspond to the spacing between the pontoon floats 210, and the elevation of the stop bar 40 is set to be disposed above the lowermost portion 232 of the boat motor 230. Thus, as the pontoon boat 200 is advanced onto the lift 100, the rails 20 capture and guide the floats 210 and limit movement of the pontoon boat 200 with respect to port and starboard. When the pontoon boat 200 reaches the desired full forward position, the lowermost portion 232 of the boat motor 230 contacts the stop bar 40 to locate the pontoon boat 200 at the desired point on the lift 100 bow to stern.

Figure 8:
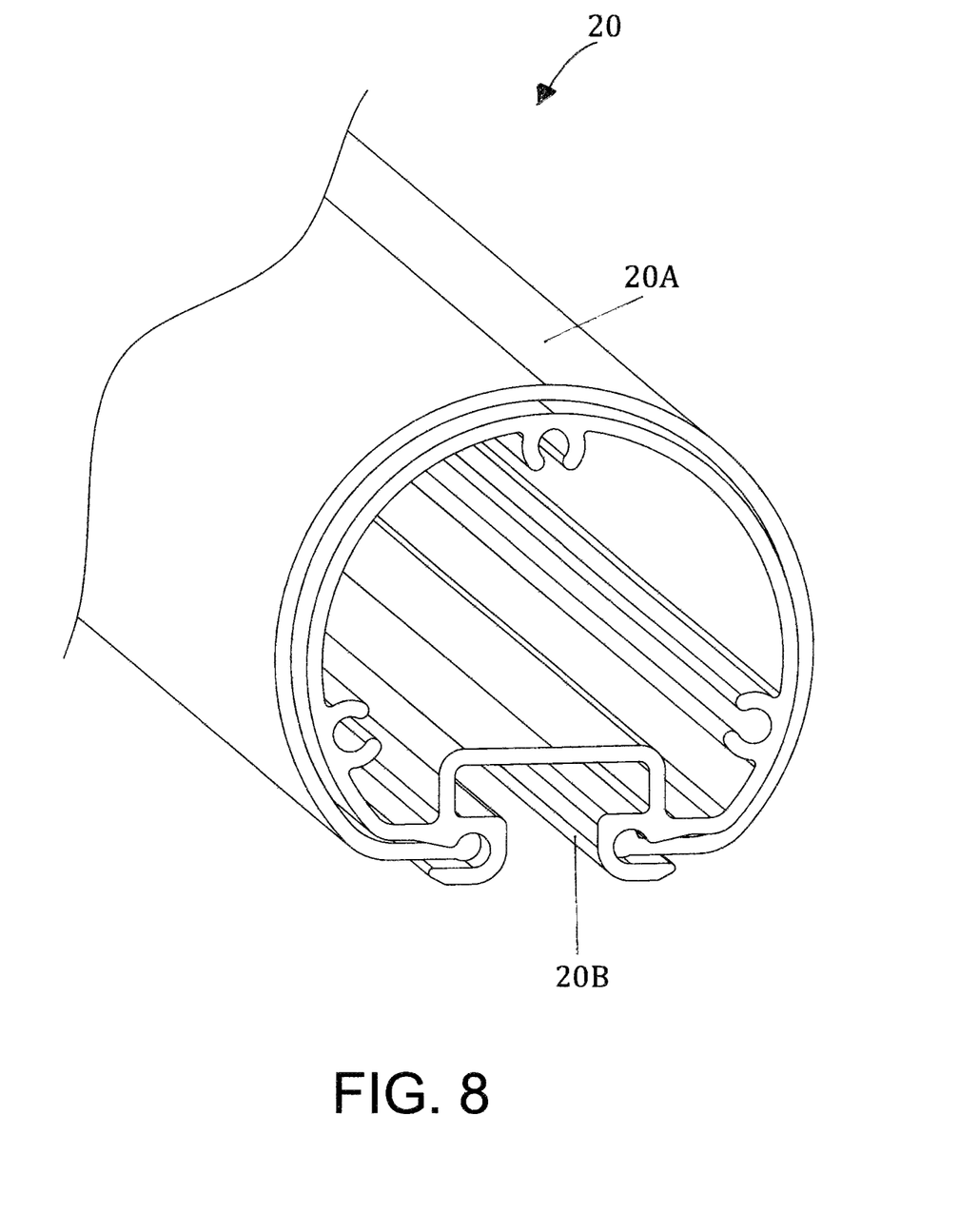
FIG. 8 is an enlarged perspective view illustrating the composition of the rail stock from which the alignment guide is constructed.

The preferred material for construction of rails 20 is illustrated in FIG. 8, and includes a polyurethane extrusion 20A that is slid over an aluminum extrusion 20B. This forms an attractive, low friction, high strength structural encased rail member that is well suited for the aquatic environment.

It is to be understood that the alignment guide 10 of the present invention may be adapted for use with watercraft other than pontoon boats, where rails 20 are laterally spaced at a distance sized to capture and matingly receive a portion of the watercraft to limit side-to-side movement. Also, the alignment guide 10 could be used with complementary aquatic devices other than boat lifts, such as boat docks and boat trailers.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

The invention claimed is:

1. Apparatus comprising:
   a pontoon boat having a pair of laterally spaced pontoon floats supporting a deck;
   a motor operably mounted to a rear portion of the deck and disposed to extend down below the floats;
   a frame having a front and a rear;
   vertically moveable transverse support beams attached at the front and rear of the frame, the support beams being moveable between a lowered position to load, and a raised position to lift the boat out of a body of water;
   vertical supports operably attached to and extending up from the movable support beams;
   an alignment guide including a pair of laterally spaced rails, the rails being generally horizontally disposed and spaced apart at a distance corresponding to spacing between the pontoon floats; and
   wherein the rails are operatively attached to the vertical supports and disposed at a selected fixed elevation above a waterline of the pontoon floats and below the deck when the support beams are in the lowered position, whereby the rails capture and guide the pontoon floats as the pontoon boat advances toward a full forward position, while limiting movement of the pontoon boat with respect to port and starboard.

2. The apparatus of claim 1 further comprising:
   a pair of downwardly directed extensions, each having an upper end and a lower end, wherein the upper end of one of the pair of extensions is attached to one of the pair of rails, and the upper end of another of the pair of extensions is attached to another of the pair of rails; and
   a stop bar attached to and interconnecting the lower ends of the pair of extensions, wherein the stop bar is disposed at an elevation above a lowermost portion of the boat motor, whereby the boat motor contacts the stop bar when the pontoon boat reaches the full forward position to locate the pontoon boat bow to stern at a desired point.

3. The apparatus of claim 2, wherein the extensions are directed downwardly and rearwardly.

4. The apparatus of claim 3, wherein the rails are formed of metal.

5. The apparatus of claim 2, wherein the vertical supports are adjustably attached to the moveable support beams, and the rails are thereby positionable at one of several fixed elevations and lateral spacings.

6. A method of lifting the pontoon boat above a body of water with the apparatus of claim 5, comprising:
   adjusting the vertical supports so that the rails are disposed at an elevation that is above the waterline of the pontoon floats and below the deck of the pontoon boat and so that the elevation of the stop bar is disposed above the lowermost portion of the boat motor when the support beams are in the lowered position;
   adjusting the lateral spacing of the rails to correspond to the spacing between the pontoon floats;
   advancing the pontoon boat toward the front of the frame, and directing the pontoon boat so that floats are positioned outwardly from the rails;
   advancing the pontoon boat until the lowermost position of the boat motor contacts the stop bar; and
   raising the support beams to the raised position.

7. The apparatus of claim 1, wherein the have a generally circular cross-section.

8. The apparatus of claim 7, wherein the metal is aluminum.

9. The apparatus of claim 8, wherein the aluminum is enclosed in a polymer casing.

10. The apparatus of claim 9, wherein the polymer casing is extruded.

11. The apparatus of claim 10, wherein the extruded polymer casing is slid around and onto the aluminum part of the rails.

12. The apparatus of claim 11, wherein the polymer is formed from polyurethane.

* * * * *